(12) United States Patent
Winston et al.

(10) Patent No.: US 11,995,018 B2
(45) Date of Patent: May 28, 2024

(54) DETERMINING A PRIVATE CONNECTION BETWEEN DEVICES OR FUNCTIONS OF A SERIAL BUS

(71) Applicant: Intel Corporation, Santa Clara, CA (US)

(72) Inventors: Marcus Winston, Aloha, OR (US); Matthew A. Schnoor, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 772 days.

(21) Appl. No.: 16/931,073

(22) Filed: Jul. 16, 2020

(65) Prior Publication Data

US 2020/0349101 A1    Nov. 5, 2020

(51) Int. Cl.
*G06F 9/455* (2018.01)
*G06F 13/10* (2006.01)
*G06F 13/40* (2006.01)

(52) U.S. Cl.
CPC ...... *G06F 13/4068* (2013.01); *G06F 9/45558* (2013.01); *G06F 13/102* (2013.01); *G06F 2009/45579* (2013.01); *G06F 2213/0026* (2013.01)

(58) Field of Classification Search
CPC .............. G06F 9/45558; G06F 2213/0026
See application file for complete search history.

(56) References Cited

U.S. PATENT DOCUMENTS

| | | | |
|---|---|---|---|
| 2013/0086288 A1* | 4/2013 | Lakshmanamurthy | G06F 13/364 710/113 |
| 2019/0042281 A1 | 2/2019 | Raghav et al. | |
| 2019/0042508 A1* | 2/2019 | Raghav | G06F 13/4282 |
| 2019/0196931 A1* | 6/2019 | Kuehnis | G06F 11/3636 |

OTHER PUBLICATIONS

Extended European Search Report dated Apr. 14, 2021 for EP Application No. 20208325.9, 13 pages.
Intel: "Trace Hub (Intel TH) Developer's Manual", Oct. 31, 2017, XP055790159, Retrieved from the Internet: URL: https://software.intel.com/sites/default/files/intel-trace-hub-developers-manual-2.1.2.pdf, pp. 20-26, 50-55, 64-65, and 125.

* cited by examiner

*Primary Examiner* — David E Martinez
(74) *Attorney, Agent, or Firm* — Schwabe, Williamson & Wyatt, P.C.

(57) ABSTRACT

Embodiments of the present disclosure may relate to the existence of a unique value associated with each PCIe function or device that is readable from two or more PCIe functions, or from a CPU running system software. Embodiments enable system software to identify which PCIe functions have private or hidden connections. In addition, embodiments may allow system software to differentiate among multiple identical instances of PCIe add-in components that have associations. Other embodiments may be described and/or claimed.

18 Claims, 7 Drawing Sheets

Non-transitory computer-readable storage medium 702, as may be implemented in embodiments of FIG. 6.

Programming instructions 704
to cause a digital content consumption device, in response to execution of the instructions by a processor of the digital content consumption device, to practice aspects of embodiments of portions of the processes of FIG. 5.

FIG. 7

DETERMINING A PRIVATE CONNECTION BETWEEN DEVICES OR FUNCTIONS OF A SERIAL BUS

TECHNICAL FIELD

Embodiments of the present disclosure generally relate to the field of interconnects, in particular to connections between devices or functions over a serial bus, such as Peripheral Component Interconnect Express (PCIe) private or hidden connections between PCIe devices or functions.

BACKGROUND

Computing platforms typically include devices or functions connected over computer buses, such as serial buses. An example of serial bus is the PCIe bus, PCIe is a local computer bus for attaching hardware devices in a computer and is part of (or derived from) the PCI Local Bus standard. PCIe devices or functions might include private logical or physical connections between the devices or functions that is not exposed to system software.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

For ease of understanding, the descriptions to follow will be presented primarily in the context of private or hidden connections of PCIe devices or functions, however the present disclosure is not limited and may be practiced on other computer buses.

PCIe functions and devices are, from a system software viewpoint, independent. This independence was purposely designed into the PCIe specifications from the beginning. However, in practice there may be a private logical or physical (hardware) connection between two or more PCIe functions. For example, there may be a private connection between a graphics PCIe function and a debug/trace PCIe function such as an Intel® Trace Hub. In legacy implementations, existence of these private connections is hidden from and not accessible by system software. However, from a systems software perspective, in particular for systems that support virtualized environments using hypervisors, awareness of a private connection between two devices or functions may be useful. Indeed, for some virtualized environments that use a hypervisor to manage multiple virtual machines, knowledge of such a private connection might be essential. For example, the hypervisor may want to not assign the respective functions with such a private connection to two separate virtual machine (VM) instances, if such instances depend on isolation and separation. Doing so may break rules of isolation and separation between VM instances. In embodiments, this may be also be important for application software usage, such as implementing debug software across all components of a computing system using a single debug application.

Embodiments of the present disclosure may relate to the existence of a unique value associated with each PCIe function or device that is readable from two or more PCIe functions, or from a CPU running system software. Embodiments enable system software to identify which PCIe functions have private or hidden connections. In addition, embodiments may allow system software to differentiate among multiple identical instances of PCIe add-in components.

Embodiments described herein may be directed to a device with a port to couple with a PCIe bus, and circuitry coupled with the port to store an identifier to indicate a private physical or logical connection between the function and another function when compared to an identifier associated with the other function. Embodiments may also be directed to a system that has one or more processors, a computer bus coupled with the processors, a first function coupled with the computer bus that includes circuitry to store a first identifier uniquely associated with the first function, a second function coupled with the computer bus that includes circuitry to store a second identifier uniquely associated with the second function, and the debug component coupled with the computer bus to compare the first identifier and the second identifier, and based upon the comparison determine whether the first function has a private physical or logical association with the second function.

In embodiments, described in more detail below, enhanced PCIe features/capabilities may store a unique value that is readable from one or more other PCIe functions. This unique value may be in a register, that when read from system software or from PCIe functions indicates the functions that are associated, or that have a private connection, with one another. In embodiments, the storing of the unique value may be implemented through a Function Association Designated Vendor-Specific Extended Capability (DVSEC) structure described further below.

Embodiments described herein may be used to provide for any general PCIe devices and functions the ability to use a standard trace hub and standard driver to perform closed-box debugging of a system, even with private connections between various application functions. This is in contrast to legacy implementations, where PCIe components such as network interface cards (NIC) and solid-state drives (SSD) have their own custom debug software and hardware. For example, in legacy implementations, NICs expose debug information in special registers which might either be undocumented or not defined in a standardized layout, and have custom applications to access such registers for debugging. This legacy implementation is not standardized and it is not scalable because it requires customization on a per-product basis. It also does not allow platform-wide debugging because each NIC debug software is unique to that NIC.

In addition, legacy implementations debugging SSD require an external hardware probe, and associated software that may not be widely available to the public. In addition, use of debugging software frequently requires detailed knowledge of the architecture and microarchitecture. Also, debugging an SSD when installed is difficult due to the requirement of the external hardware probe. Embodiments described herein may be useful for PCIe devices other than NICs or SSDs.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. It will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

As used herein, the term "module" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable components that provide the described functionality.

Figure 1:
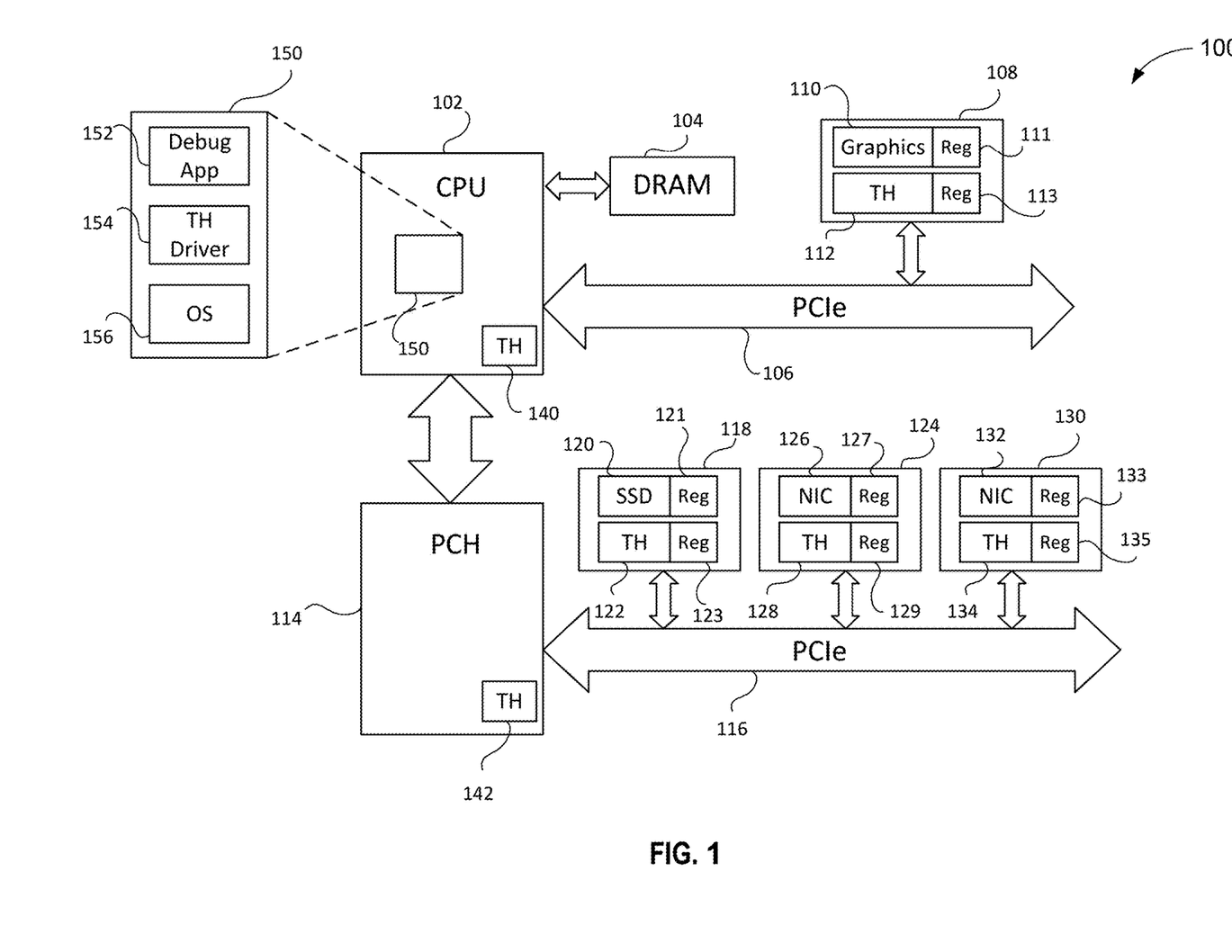
FIG. 1 illustrates an example computing system that includes devices connected to a PCIe bus, in accordance with various embodiments.

FIG. 1 illustrates an example computing system that includes devices connected to a PCIe bus, in accordance with various embodiments. FIG. 1 shows a computing system 100 that includes a CPU 102 that may be coupled with a dynamic random access memory (DRAM) 104 and also coupled with a PCIe bus 106. The PCIe bus 106 may be coupled with a PCIe device 108 that may include a graphics function 110 and a trace hub function 112. In embodiments, the trace hub function 112 (or simply trace hub) may include an Intel® Trace Hub. In other embodiments, the trace hub function 112 may perform the functions of a trace aggregator or trace data collector.

Embodiments may include server systems where any of the PCIe devices that attach to the Platform Controller Hub (PCH) 114 PCIe bus 116 could also attach to the CPU 102 PCIe bus 106. In embodiments, such a PCIe bus 106 could also have an external PCIe switch device (not shown) which serves to fan-out or virtually split the PCIe lanes to connect multiple devices, i.e., one x16 upstream port to four x4 downstream ports. Such a switch device could also have trace hub capabilities, and might need to have its own internal private function association. It should be appreciated that the configuration of computing system 100 is a non-limiting example.

The CPU 102 may also be coupled with a PCH 114, which is coupled to another PCIe bus 116. The PCIe bus 116 may be coupled with a first PCIe device 118, which may include a SSD function 120 as well as a trace hub function 122, a second PCIe device 124 which may include a first NIC function 126 as well as an associated trace hub function 128, and a third PCIe device 130 which may include a second NIC function 132 as well as an associated trace hub function 134. In embodiments, NIC function 132, or any other function described in computing system 100, may be another function. For example, it may but is not limited to an acceleration engine, wireless baseband processor, Thunderbolt® or USB-4 host controller interface, co-processor or media processing engine, field programmable gate array (FPGA)-based accelerator or other compute element, device that accesses coherent system memory, or any other PCIe-based application processor.

The CPU 102 may include system software 150 that may include a debug application 152, a trace hub Driver 154, and the Operating System (OS) 156. In embodiments, the OS 156 could be any version of an OS, and may include a hypervisor or some other Virtual Machine (VM) management system. The CPU 102 may also include a trace hub 140, and the PCH 114 may also include a Trace Hub 142. In embodiments, it would be desirable to have the debug application 152, in conjunction with the trace hub driver 154 and OS 156, be able to debug the computing system 100 and all components using the CPU 102 and system software component 150.

In embodiments, during a debug operation, the debug application 152 may receive data each of the trace hub functions 112, 122, 128, 124, 140, 142 throughout the computing system 100. However, in legacy implementations this may be problematic because two or more functions on a PCIe device, such as the graphics function 110 and the trace hub function 112 of PCIe device 108 may have private or hidden logical or physical connections between them that the system software 150 does not know about and does not have a way of discovering. For example when a hypervisor is running on the computing system 100, it is possible for the graphics function 110 and the trace hub function 112 to be running on different virtual machines. A private or hidden logical or physical connection between them would violate separation rules of virtual machines. This is described in further detail with respect to FIGS. 2-3. To address these issues, CPU 102, PCH 114, and PCIe devices 108, 118, 124 and 130 (and/or their functions) are incorporated with the teachings of the present disclosure to enable determination of private or hidden connections between PCIe devices or functions.

Embodiments described herein include adding a unique value for each PCIe function that may be read by system software 150 or by one or more other PCIe functions to indicate how functions may be associated with each other through private or hidden logical or physical connections. In embodiments, this unique value may be stored in a register. For example, with respect to PCIe device 108, the graphics function 110 would have a unique value stored in its register 111, and the Trace Hub function 112 would have unique value stored in its register 111. In this way, the system software 150 is able to query the registers 111, 113, and based on the results determine whether there is a private connection between these two separate PCIe functions. Although this example uses a private connection between a graphics function 110 and an associated trace hub 112, the identification of existing private connections may be made between any two PCIe functions.

As shown, SSD function 120 would include register 121, NIC function 126 would include register 124, and NIC function 132 would include register 133. Trace Hub functions 122, 128, 134 would include, respectively, registers 123, 129, 135. In embodiments, the registers may be implemented according to DVSEC that is referred to in more detail below.

Figure 2:
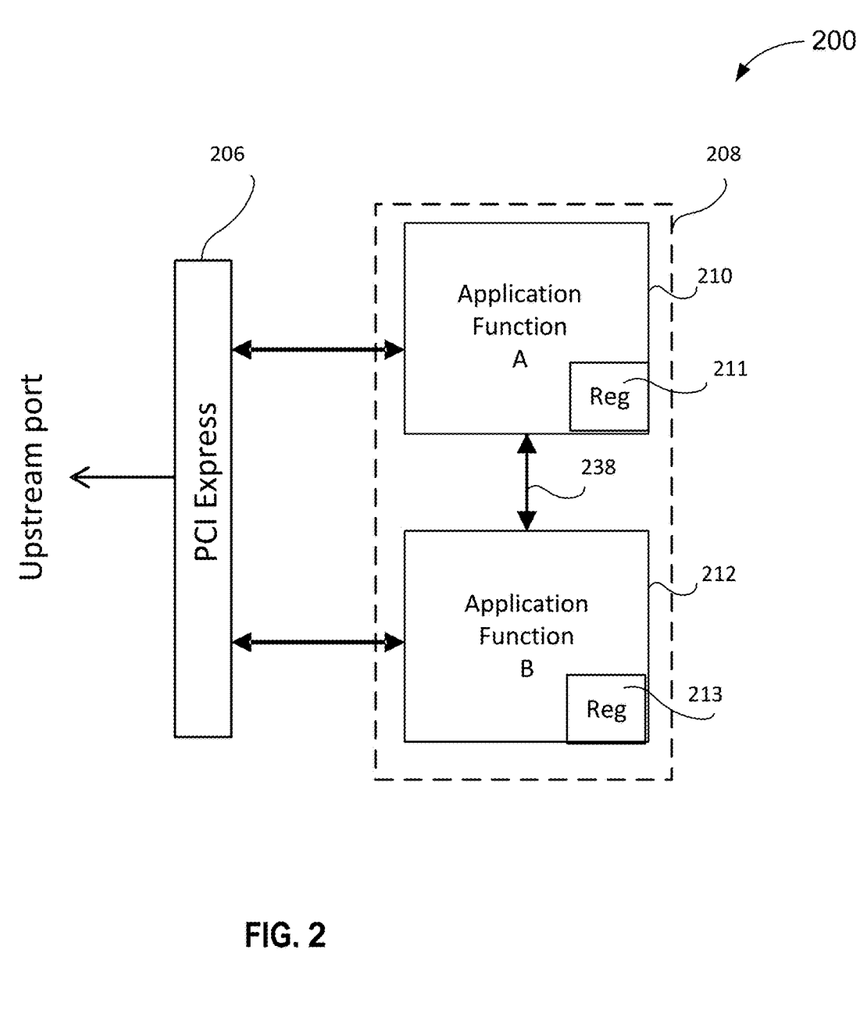
FIG. 2 illustrates a schematic of an example PCIe-compliant device that includes two functions, in accordance with various embodiments.

FIG. 2 illustrates a schematic of an example PCIe-compliant device that includes two functions, in accordance with various embodiments. FIG. 2 shows a PCIe-compliant device 208 of a computing platform 200, that is coupled with the PCIe bus 206. The PCIe bus 206 is further coupled to one or more upstream ports. The device 208 includes a PCIe Application Function A 210 that includes a register 211. The Application Function A 210 may implement a number of different functions, for example graphics, SSD, NIC, memory, printing, accelerators, audio, or Trace Hub. Similarly, PCIe Application Function B 202 includes a register 213, and may implement a number of different functions as discussed above with respect to Application Function A 210. Device 208 may not be limited to just two Application Functions 210, 212, but may also include any number of PCIe functions that are exposed to system software.

As shown, Application Function A 210 and Application Function B 212 have a logical or physical private connection 238 (which may also be referred to as a hidden connection). In legacy implementations, this private connection 238 may be private or hidden from the viewpoint of system software 150. In embodiments, the private connection 238 may support Visualization of Internal Signals Architecture (VIS), Distributed Test Function (DTF), and Intel On-chip System Fabric (IOSF) or any other technique of transmitting signals and/or data between the Application Functions.

In embodiments, the registers 211, 213 may be implemented using DVSEC as mentioned above. The functionality of the DVSEC may include the presence of a single unique identifier which is visible in two (or, in embodiments, more than two) PCI Express Functions. The fact that a single unique identifier (unique within the scope of the system, if not a globally unique identifier) appears in two distinct functions may inform system software of the unique connection, or association, between the two functions.

The Function Association DVSEC can be implemented in, fundamentally, at least two ways: read-only, or read/write. The read-only implementation utilizes a pre-determined, fixed, and read-only globally/universally unique identifier (GUID/UUID) which is exposed in the Function Association DVSEC of each PCI Express Function 210, 212.

In embodiments, the read-write implementation allows system software 150 to write a unique value, which may only need to be unique in the context of the system 100, to each writeable Function Association entry in each Function Association DVSEC (for example, Reg 211 and Reg 213). The system-wide unique identifier written to the Function Association Entry could be, for example, an incrementing integer which is unique for each Function Association Entry. After a read-write Function Association entry is written, the other PCI Express Functions in the system can be scanned for that same unique value. When the value is found, the two Functions are known to be associated according to the Function Association Type. This is discussed further with respect to FIG. 4, Register Specification of the DVSEC. In embodiments, in addition to associating Application Functions 210, 212 by a unique value, they may also be associated by a particular type.

Figure 3:
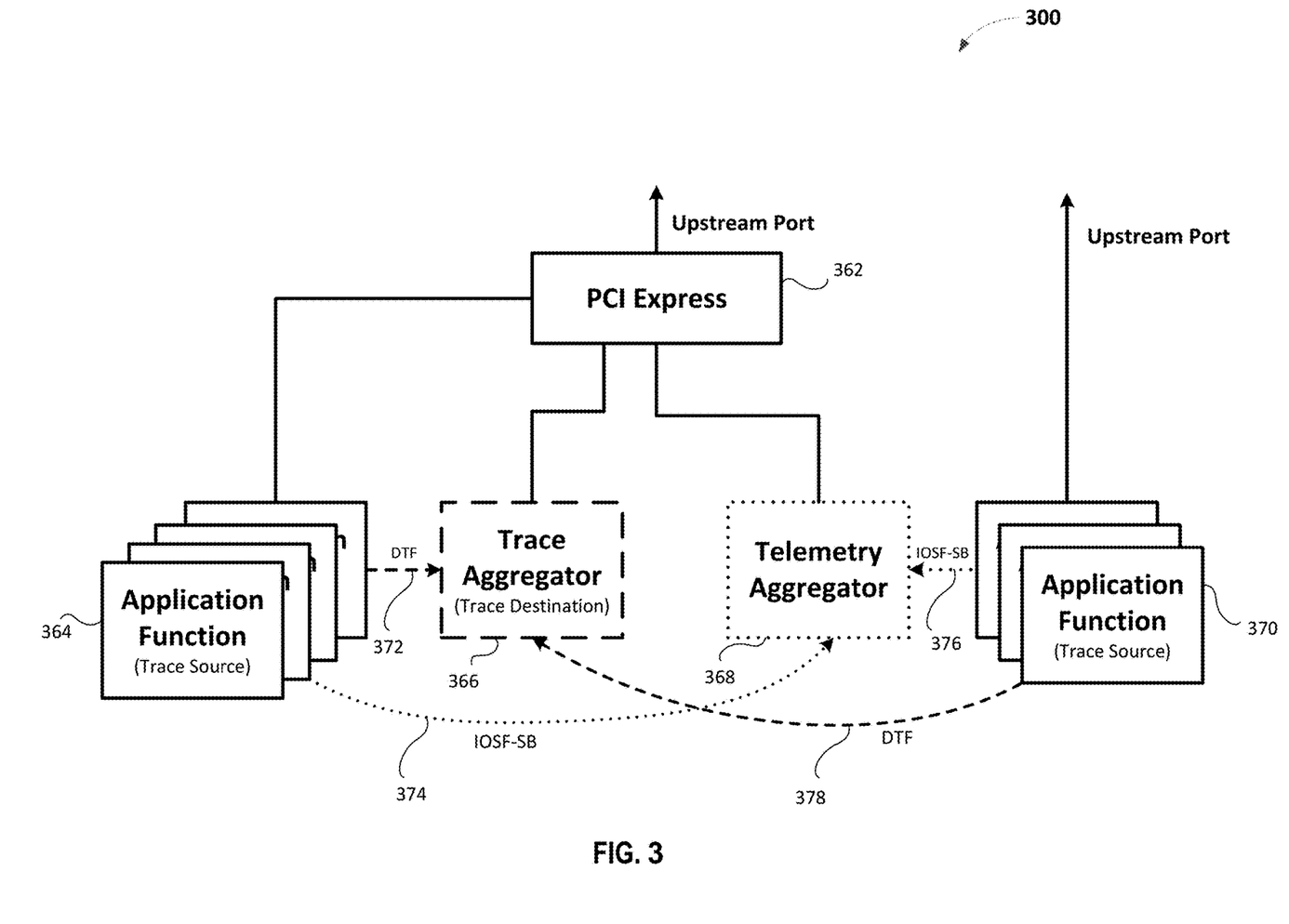
FIG. 3 illustrates an example of two different types of private or hidden connections in a computing system, in accordance with various embodiments.

FIG. 3 illustrates an example of two different types of private or hidden connections in a computing system, in accordance with various embodiments. FIG. 3 shows a different configuration of a PCIe device 362 of a computing system 300, which may be similar to PCIe device 108 of computing system 100 of FIG. 1, that includes a number of Application Functions 364, as well as a Trace Aggregator 366 that may be similar to Trace Hub 112 and a Telemetry Aggregator 368. Each Application Function 364, 366, or 368 includes a DVSEC mechanism (similar to register 211 of Application Function A 210 but not shown here) to indicate private connections between the otherwise logically separate Application Functions.

As illustrated, DVSEC can be used to describe any type of connection or association between two or more Application Functions. For example, additional Application Functions 370 may be identified by the system 100 and are able to establish private connections or other relationships based on different types. One or more of the Application Functions 364 may have a private connection 372 with the Trace Aggregator 366, and one or more of the Application Functions 370 may similarly have a private connection 378 with the Trace Aggregator 366. The private connections 372, 378 may be implemented via DTF.

A separate type of association, which may be a private connection, may exist between one or more of the Application Functions 364 and the Telemetry Aggregator 368 indicated by connection 374, and between one or more Application Functions 370 and the Telemetry Aggregator 368 over connection 376. In embodiments, the connections 374, 376 may be implemented via IOSF Side Band (IOSF-SB). In embodiments, this would be hardware connection. As shown in diagram 300, a particular Application Function 364 may be associated with multiple Application Functions 366, 368.

Figure 4:
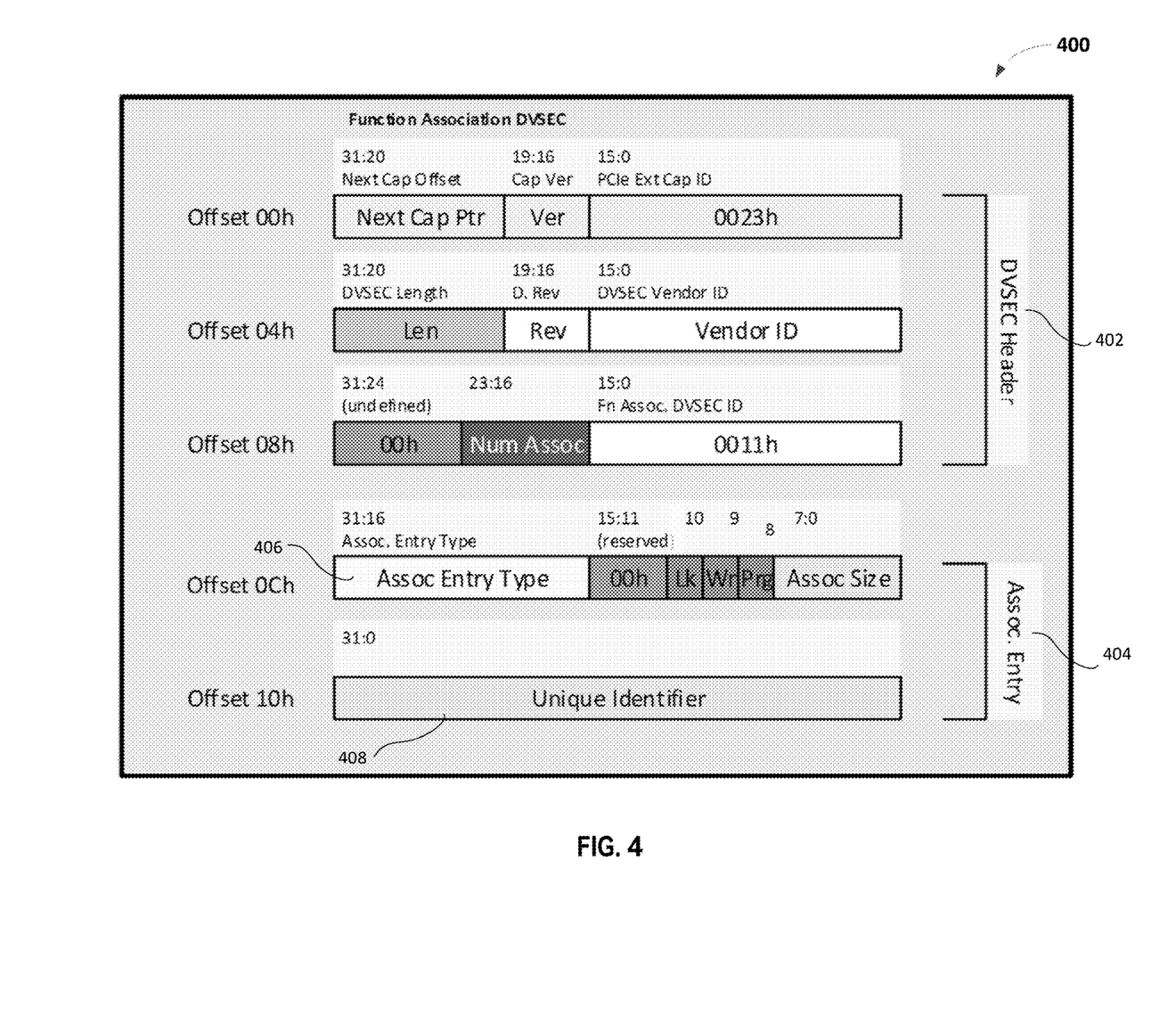
FIG. 4 shows an example of a bit layout for a function association, in accordance with various embodiments.

FIG. 4 shows an example of a bit layout for a function association, in accordance with various embodiments. FIG. 4 shows an example Function Association DVSEC 400, that includes a sequence of bits describing a DVSEC Header 402 with respective offsets, followed by one or more Associated Entry Fields 404. These fields are used to indicate which Application Function is associated with another Application Function. The Associated Entry Fields 404 include an associated entry type 406 and a unique identifier 408. Various Function Association types may include a trace aggregator association type that may be used with a Trace Hub Function, a telemetry association, or a timestamp association. Other future associations may be designed and added to the Function Association DVSEC 400.

Figure 5:
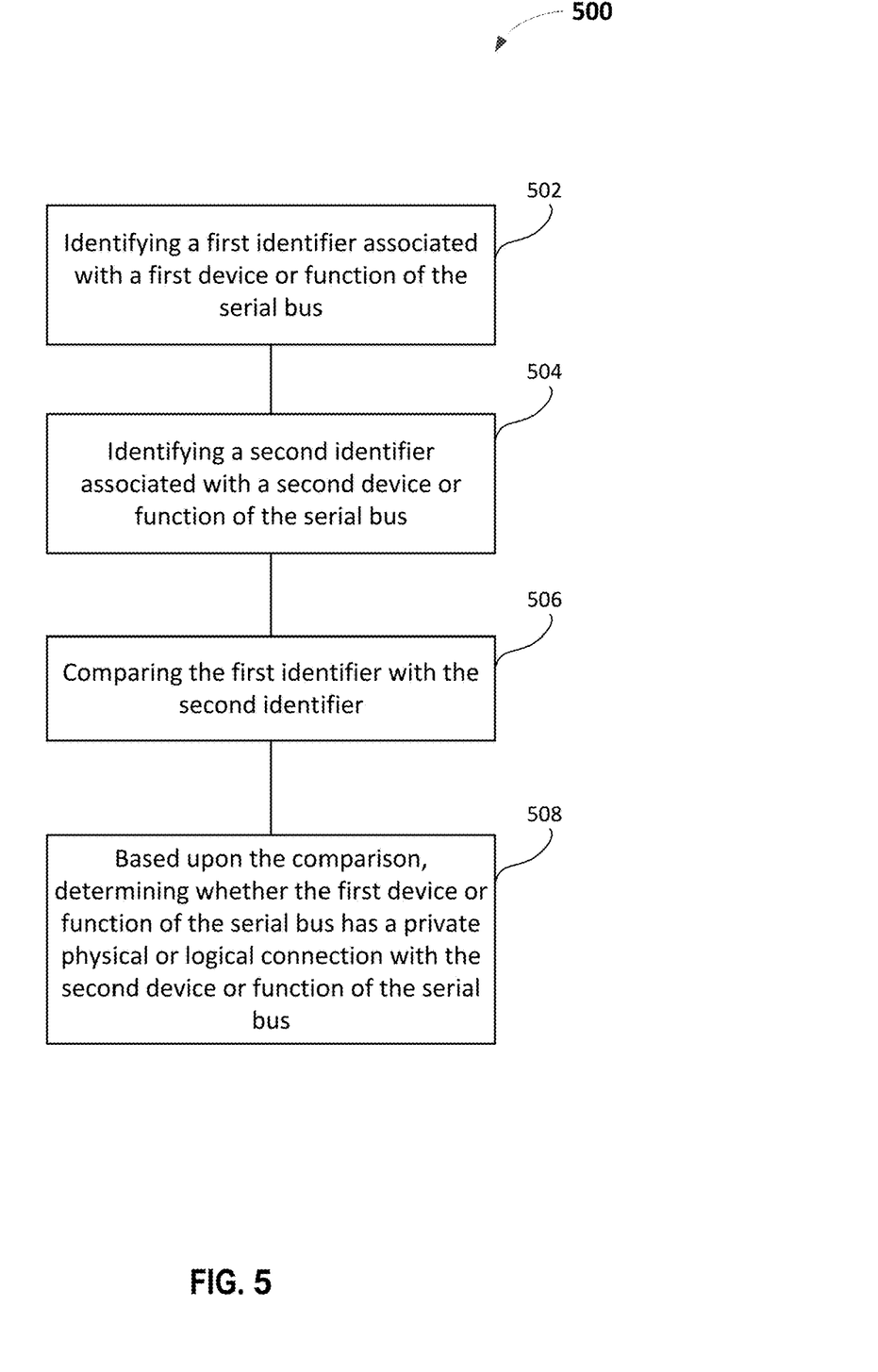
FIG. 5 shows an example process for a computer system to identify a private or hidden connection between two devices or functions, in accordance with various embodiments.

FIG. 5 shows an example process for a computer system to identify a private or hidden connection between two devices or functions, in accordance with various embodiments. Process 500 may be implemented by CPU 102 and portions of system software 150 of FIG. 1, and may interact with one or more elements as shown with respect to FIGS. 1-4 to identify private or hidden connections between two devices or functions.

At block 502, the process may include identifying a first identifier associated with a first device or function of a serial bus. In embodiments, the first device or function may include Application Functions 110, 112, 120, 122, 126, 128, 132, 134 of FIG. 1, with the first identifier available, respectively, in register 111, 113, 121, 123, 127, 129, 133, 135. In embodiments as described above, the identifiers in the registers uniquely identify the respective Function Application and expose the identifier information to the CPU 102 and system software 150. In embodiments, the serial bus may be similar to PCIe buses 106, 116 of FIG. 1. In embodiments, the first identifier may be similar to the unique identifier 408 of FIG. 4.

At block 504, the process may include identifying a second identifier associated with a second device or function of the serial bus. Similar to block 502, the second device or function may include Application Functions 110, 112, 120, 122, 126, 128, 132, 134 of FIG. 1, with the second identifier available, respectively, in register 111, 113, 121, 123, 127, 129, 133, 135. In embodiments as described above, the identifiers in the registers uniquely identify the respective Function Application and expose the information to the CPU 102 and system software 150. In embodiments, the serial bus may be similar to PCIe buses 106, 116 of FIG. 1. In embodiments, the first identifier may be similar to the unique identifier 408 of FIG. 4.

At block 506, the process may include comparing the first identifier with the second identifier. In embodiments, the value of the first identifier is compared with the value the second identifier.

At block 508, based upon the comparison, determining whether the first device or function of the serial bus has a private physical or logical connection with the second device or function of the serial bus. In embodiments, the determination may be made if the value of the first identifier is equal to the value of the second identifier. In other embodiments, the determination may be made if there is a relationship between the value the first identifier and the value of the second identifier. Furthermore, in embodiments, an Association Entry Type, such as Association Entry Type 406 of FIG. 4 may also be used to compare a type of the private physical or logical connection.

In embodiments, all or part of the process 500 may be implemented during a PCIe enumeration performed by the operating system of CPU 102. In embodiments, during enumeration, the information on identifiers and types of the various devices or functions may be collected and published in a location within memory of the CPU 102.

Figure 6:
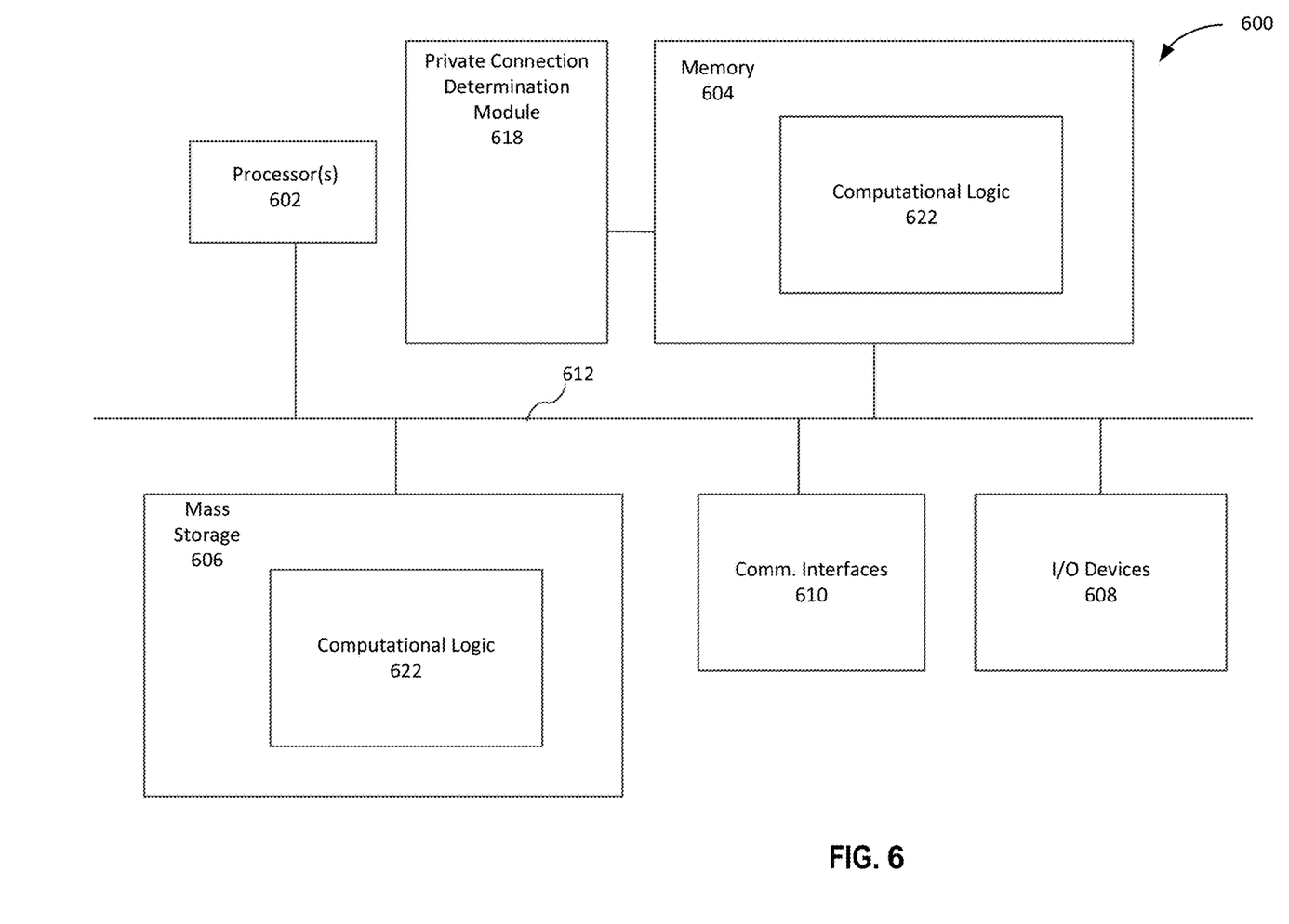
FIG. 6 illustrates an example computing device 600 suitable for use with various components of FIGS. 1-5, in accordance with various embodiments.

FIG. 6 illustrates an example computing device 600 suitable for use with various components of FIGS. 1-4, in accordance with various embodiments. For example, the computing device 600 may include the CPU 102 of FIG. 1. As shown, computing device 600 may include one or more processors or processor cores 602 and system memory 604. For the purpose of this application, including the claims, the terms "processor" and "processor cores" may be considered synonymous, unless the context clearly requires otherwise. The processor 602 may include any type of processors, such as CPU 102, a microprocessor, and the like. The processor 602 may be implemented as an integrated circuit having multi-cores, e.g., a multi-core microprocessor.

The computing device 600 may include mass storage devices 606 (such as diskette, hard drive, volatile memory (e.g., dynamic random-access memory (DRAM), compact disc read-only memory (CD-ROM), digital versatile disk (DVD), and so forth) . . . . In general, system memory 604 and/or mass storage devices 606 may be temporal and/or persistent storage of any type, including, but not limited to, volatile and non-volatile memory, optical, magnetic, and/or solid state mass storage, and so forth. Volatile memory may include, but is not limited to, static and/or dynamic random access memory. Non-volatile memory may include, but is not limited to, electrically erasable programmable read-only memory, phase change memory, resistive memory, and so forth.

The computing device 600 may further include I/O devices 608 (such as a display (e.g., a touchscreen display)), keyboard, cursor control, remote control, gaming controller, image capture device, a camera, one or more sensors, and so forth) and communication interfaces 510 (such as network interface cards, modems, infrared receivers, radio receivers (e.g., Bluetooth), and so forth).

The communication interfaces 610 may include communication chips (not shown) that may be configured to operate the device 600 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond.

The above-described computing device 600 elements may be coupled to each other via system bus 612, which may represent one or more buses, and which may include, for example, PCIe buses 106, 116. In other words, all or selected ones of processors 602, memory 604, mass storage 606, communication interfaces 610 and I/o devices 608 may be PCIe devices. In particular, they may be PCIe devices (functions) having private or hidden connections with other PCIe devices (functions), and incorporated with the teachings of the present disclosure to enable the private or hidden connections to be determined, as earlier described. In the case of multiple buses, they may be bridged by one or more bus bridges (not shown). Each of these elements may perform its conventional functions known in the art. In particular, system memory 604 and mass storage devices 606 may be employed to store a working copy and a permanent copy of the programming instructions for the operation of various components of computing device 600, including but not limited to an operating system of computing device 600, one or more applications, and/or system software/firmware in support of practice of the present disclosure, such as OS 156, Trace Hub driver 154 and Debug Application 153 of FIG. 1, collectively referred to as computing logic 622, having private connection determination module 618. The various elements may be implemented by assembler instructions supported by processor(s) 602 or high-level languages that may be compiled into such instructions.

The permanent copy of the programming instructions may be placed into mass storage devices 606 in the factory, or in the field through, for example, a distribution medium (not shown), such as a compact disc (CD), or through communication interface 610 (from a distribution server (not shown)). That is, one or more distribution media having an implementation of the agent program may be employed to distribute the agent and to program various computing devices.

The number, capability, and/or capacity of the elements 602, 604, 606, 608, 610, and 612 may vary, depending on whether computing device 600 is used as a stationary computing device, such as a set-top box or desktop computer, or a mobile computing device, such as a tablet computing device, laptop computer, game console, or smartphone. Their constitutions are otherwise known, and accordingly will not be further described.

In embodiments, at least one of processors 602 may be packaged together with computational logic 622 configured to practice aspects of embodiments described herein to form a System in Package (SiP) or a System on Chip (SoC).

In various implementations, the computing device 600 may be one or more components of a data center, a laptop, a netbook, a notebook, an ultrabook, a smartphone, a tablet, a personal digital assistant (PDA), an ultra mobile PC, a mobile phone, a digital camera, or an IoT user equipment. In further implementations, the computing device 600 may be any other electronic device that processes data.

Figure 7:
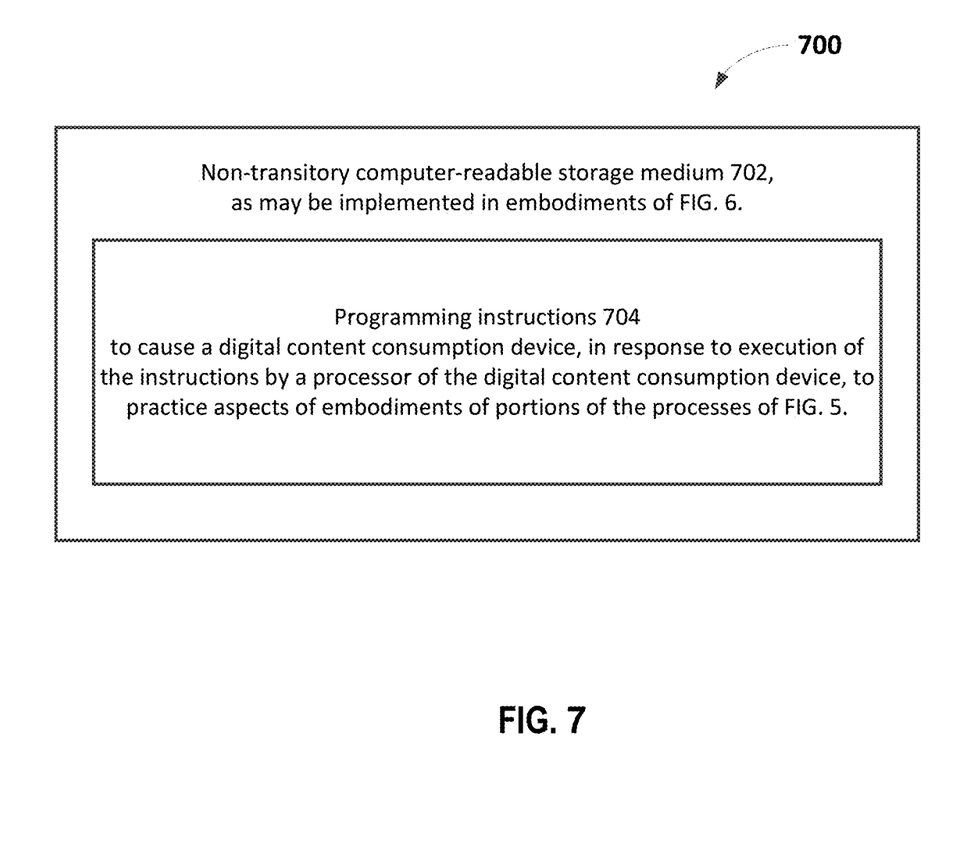
FIG. 7 depicts a computer-readable storage medium that may be used in conjunction with the computing device 600, in accordance with various embodiments.

FIG. 7 depicts a computer-readable storage medium that may be used in conjunction with the computing device 700, in accordance with various embodiments.

Diagram 700 illustrates an example non-transitory computer-readable storage media 702 having instructions configured to practice all or selected ones of the operations associated with the processes described above. As illustrated, non-transitory computer-readable storage medium 702 may include a number of programming instructions 704 (e.g., including Private Connection Determination Module 618). Programming instructions 704 may be configured to enable a device, e.g., computing device 600, in response to execution of the programming instructions, to perform one or more operations of the processes described in reference to FIGS. 1-5. In alternate embodiments, programming instructions 704 may be disposed on multiple non-transitory computer-readable storage media 702 instead. In still other embodiments, programming instructions 704 may be encoded in transitory computer-readable signals.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated implementations, including what is described in the Abstract, is not intended to be exhaustive or to limit the embodiments of the present disclosure to the precise forms disclosed. While specific implementations and examples are described herein for illustrative purposes, various equivalent modifications are possible within the scope of the present disclosure, as those skilled in the relevant art will recognize.

These modifications may be made to embodiments of the present disclosure in light of the above detailed description. The terms used in the following claims should not be construed to limit various embodiments of the present disclosure to the specific implementations disclosed in the specification and the claims. Rather, the scope is to be determined entirely by the following claims, which are to be construed in accordance with established doctrines of claim interpretation.

Some non-limiting examples are provided below.

Examples

Example 1 is a PCIe device, comprising: a port to couple with a PCIe bus; circuitry coupled with the port to store an identifier, the identifier to indicate a private physical or logical connection between the device and another device when compared to an identifier associated with the other device.

Example 2 may include the PCIe device of example 1, wherein the identifier is accessed by one or more other devices attached to the PCIe bus.

Example 3 may include the PCIe device of example 1, wherein the identifier is unique to a system, is a globally unique identifier (GUID), or is a universally unique identifier (UUID).

Example 4 may include the PCIe device of example 1, wherein the identifier of the device and the identifier of the other device is a same identifier.

Example 5 may include the PCIe device of example 1, wherein the identifier is stored in a register in the circuitry.

Example 6 may include the PCIe device of any one of examples 1-5, wherein the register is a Designated Vendor-Specific Extended Capability Structure (DVSEC) register.

Example 7 may include the PCIe device of any one of examples 1-5, wherein the PCIe device or the other device are PCIe functions.

Example 8 may include the PCIe device of any one of examples 1-5, wherein the PCIe device is an Intel® Trace Hub.

Example 9 is a computer-implemented method for determining a private physical or logical connection between devices or functions of a serial bus, the method comprising: identifying, by a computing device, a first identifier associated with a first device or function of the serial bus; identifying, by the computing device, a second identifier associated with a second device or function of the serial bus; comparing, by the computing device, the first identifier with the second identifier; and based upon the comparison, determining, by the computing device, whether the first device or function of the serial bus has a private physical or logical connection with the second device or function of the serial bus.

Example 10 may include the computer-implemented method of example 9, wherein the serial bus is a PCIe bus.

Example 11 may include the computer-implemented method of example 9, wherein the second device or function of the serial bus is a plurality of devices or functions.

Example 12 may include the computer-implemented method of example 9, wherein comparing the first identifier with the second identifier further includes comparing a first association type with a second association type.

Example 13 may include the computer-implemented method of any one of examples 9-12, wherein the first identifier is stored in a DVSEC register of the first device or function and the second identifier is stored in a DVSEC register of the second device or function.

Example 14 may include the computer-implemented method of any one of examples 9-12, wherein the first identifier and the second identifier is a predetermined, fixed identifier.

Example 15 is a system, comprising: one or more processors; a computer bus coupled with the one or more processors; a first function coupled with the computer bus, the first function including circuitry to store a first identifier uniquely associated with the first function; a second function coupled with the computer bus, the second function including circuitry to store a second identifier uniquely associated with the second function; a debug component coupled with the computer bus to: compare the first identifier and the second identifier; and based upon the comparison, determine whether the first function has a private physical or logical association with the second function.

Example 16 may include the system of example 15, wherein the first function and the second function are a same function.

Example 17 may include the system of example 15, wherein the first function is an Intel® Trace Hub.

Example 18 may include the system of example 15, wherein the one or more processors is running a hypervisor, and wherein the first function is under a control of a first virtual machine, and the second function is under a control of a second virtual machine.

Example 19 may include the system of example 15, wherein the second function further includes multiple functions.

Example 20 may include the system of any one of examples 15-19, wherein the debug component further includes debug software running on the one or more processors.

We claim:

1. A peripheral component interconnect express (PCIe) device, comprising:
   a port to couple with a PCIe bus of an electronic device; and
   circuitry coupled with the port, the circuitry to store an identifier, wherein the identifier indicates a private connection between the PCIe device and another PCIe device when the identifier matches an identifier associated with the other PCIe device;
   wherein the private connection is a connection between the PCIe device and the other PCIe device that is hidden to system software of the electronic device in the absence of the identifier.

2. The PCIe device of claim 1, wherein the identifier is accessed by one or more other devices attached to the PCIe bus.

3. The PCIe device of claim 1, wherein the identifier is unique to a system, is a globally unique identifier (GUID), or is a universally unique identifier (UUID).

4. The PCIe device of claim 1, wherein the identifier is stored in a register in the circuitry.

5. The PCIe device of claim 4, wherein the register is a Designated Vendor-Specific Extended Capability (DVSEC) register.

6. The PCIe device of claim 1, wherein the PCIe device or the other PCIe device are PCIe functions.

7. A computer-implemented method for determining a private connection between devices or functions of a peripheral component interconnect express (PCIe) bus, the method comprising:
   identifying, by a computing device, a first identifier associated with a first device or function of the serial bus;
   identifying, by the computing device, a second identifier associated with a second device or function of the serial bus;
   identifying, by the computing device, that the first identifier corresponds to the second identifier; and
   identifying, by the computing device based on an identification that the first identifier corresponds to the second identifier, that the first device or function of the serial bus has a private connection with the second device or function of the serial bus, wherein a private connection is a connection that is not detectable by system software of the computing device in the absence of the first and second identifiers.

8. The computer-implemented method of claim 7, wherein the private connection is a private physical connection.

9. The computer-implemented method of claim 7, wherein the second device or function of the serial bus is a plurality of devices or functions.

10. The computer-implemented method of claim 7, wherein identifying that the first identifier corresponds to the second identifier includes comparing a first association type of the first identifier with a second association type of the second identifier.

11. The computer-implemented method of claim 7, wherein the first identifier is stored in a DVSEC register of the first device or function and the second identifier is stored in a DVSEC register of the second device or function.

12. The computer-implemented method of claim 7, wherein the first identifier and the second identifier are predetermined, fixed identifiers.

13. The method of claim 7, wherein the first identifier and the second identifier are unique identifiers that match one another and are not otherwise reused by the computing device.

14. The method of claim 7, wherein the private connection is a private logical connection.

15. A system, comprising:
   one or more processors;
   a computer bus coupled with the one or more processors;
   a first function coupled with the computer bus, the first function including circuitry to store a first identifier associated with the first function;
   a second function coupled with the computer bus, the second function including circuitry to store a second identifier associated with the second function; and
   a debug component coupled with the computer bus, the debug component to identify, based on a comparison of the first identifier to the second identifier, that the first function has a private connection with the second function, wherein a private connection is a connection that is not identifiable to system software of the system in the absence of the first and second identifiers.

16. The system of claim 15, wherein the one or more processors are running a hypervisor, and wherein the first function is under a control of a first virtual machine, and the second function is under a control of a second virtual machine.

17. The system of claim 15, wherein the second function further includes multiple functions.

18. The system of claim 15, wherein the debug component further includes debug software running on the one or more processors.

\* \* \* \* \*